(12) United States Patent
Calabria

(10) Patent No.: US 7,409,362 B2
(45) Date of Patent: Aug. 5, 2008

(54) VENDOR-DRIVEN, SOCIAL-NETWORK ENABLED REVIEW SYSTEM AND METHOD WITH FLEXIBLE SYNDICATION

(75) Inventor: Hermann Calabria, Los Altos, CA (US)

(73) Assignee: Diamond Review, Inc., Los Altos, CA (US)

( * ) Notice: Subject to any disclaimer, the term of this patent is extended or adjusted under 35 U.S.C. 154(b) by 371 days.

(21) Appl. No.: 11/022,282

(22) Filed: Dec. 23, 2004

(65) Prior Publication Data

US 2006/0143067 A1      Jun. 29, 2006

(51) Int. Cl.
*G06Q 30/00* (2006.01)
(52) U.S. Cl. ....................................................... 705/26
(58) Field of Classification Search ................... 705/26, 705/27
See application file for complete search history.

(56) References Cited

U.S. PATENT DOCUMENTS

| | | | |
|---|---|---|---|
| 5,918,214 | A | 6/1999 | Perkowski |
| 5,950,173 | A | 9/1999 | Perkowski |
| 6,334,131 | B2 | 12/2001 | Chakrabarti et al. |
| 6,356,899 | B1 | 3/2002 | Chakrabarti et al. |
| 6,421,669 | B1 | 7/2002 | Gilmour et al. |
| 7,139,728 | B2 | 11/2006 | Rigole |
| 7,143,089 | B2 | 11/2006 | Petras et al. |
| 7,310,350 | B1* | 12/2007 | Shao et al. .................. 370/466 |
| 2002/0010628 | A1* | 1/2002 | Burns .......................... 705/14 |
| 2002/0023230 | A1 | 2/2002 | Bolnick et al. |
| 2002/0107861 | A1 | 8/2002 | Clendinning et al. |
| 2002/0124053 | A1 | 9/2002 | Adams et al. |
| 2002/0147710 | A1 | 10/2002 | Hu |
| 2003/0066068 | A1 | 4/2003 | Gutta et al. |
| 2003/0093793 | A1 | 5/2003 | Gutta |
| 2003/0191753 | A1 | 10/2003 | Hoch |
| 2004/0133463 | A1 | 7/2004 | Benderev |
| 2004/0148275 | A1 | 7/2004 | Achlioptas |
| 2004/0162830 | A1 | 8/2004 | Shirwadkar et al. |
| 2004/0172267 | A1 | 9/2004 | Patel et al. |
| 2004/0205065 | A1 | 10/2004 | Petras et al. |
| 2004/0215793 | A1 | 10/2004 | Ryan et al. |
| 2005/0198031 | A1* | 9/2005 | Pezaris et al. .................. 707/9 |

OTHER PUBLICATIONS

Thomas E. Weber, Wall Street Journal, New York, N.Y., May 30, 1996, p. 86, http://proquest.umi.com/pqdweb?did=766149361&sid=8&Fmt=3&clientId=19649&RQT=309&VName=PQD.*
http://www.foaf-project.org (2004).

(Continued)

*Primary Examiner*—Jeffrey A. Smith
*Assistant Examiner*—Mila Airapetian
(74) *Attorney, Agent, or Firm*—Perkins Coie LLP

(57) ABSTRACT

The embodiments of the present system include a review engine that is connected to support modules and databases that receive, store and retrieve reviews, based upon the subject and the users' relationship to the authors of the reviews. The review engine comprises a social network engine, a rate and rank engine, a credentials engine and a privacy engine. These engines allow reviews to be sorted, filtered and ordered in terms of relevance when presented to the user. Numerous methods are also provided by the system that receive, store and retrieve reviews.

30 Claims, 15 Drawing Sheets

OTHER PUBLICATIONS http://www.vbulletin.com (2004).
http://www.invisionpowerboard.com (2004).
http://www.google.com (2004).
http://www.yahoo.com (2004).
http://www.truste.org (2004).
http://www.bbbonline.org (2004).
http://www.jewelersboard.com (2004).
http://www.virtualmechanics.com (2004).

* cited by examiner

SAMPLE LOCATOR-CODE RECORD 138

| LOCATOR CODE 140 | SUBJECTID 142 | IDENTIFIER/DESC. 144 | ADDITIONAL INSTRUCTIONS 146 |
|---|---|---|---|
| V9A4-4T1-4H7 | 49 | JANE DOE<br>jane@domain.com<br>212-555-1212<br><br>BOUGHT 2.5ct DIAMOND RING FROM SALESMAN ROBERT SMITH | 1. PRESENT REVIEW FORM FOR JEWELER CATEGORY<br>2. PRESENT REVIEW FORM FOR DIAMOND RINGS WITH CENTER STONES>2 ct<br>3. PRESENT REVIEW FORM FOR SALESMAN ROBERT SMITH<br>4. PRESENT COUPON $100 NEXT PURCHASE<br>5. REQUEST REGISTRATION TO REVIEW-PROVIDER SYSTEM<br>6. REQUEST ADDITION OF FRIENDS INTO SOCIAL NETWORK |
| | | ADDITIONAL LOCATORS... | |
| XYH1-A8N-2R 148 | | | |
| 28-451-44 | | | |

FIG. 8

SAMPLE SEAL

```
<a href=http://www.diamondreview.com/?k=doejewelers>
   <img src="http://www.diamondreview.com/seals/doejewelers.gif">
</a>
```

VENDOR-DRIVEN, SOCIAL-NETWORK ENABLED REVIEW SYSTEM AND METHOD WITH FLEXIBLE SYNDICATION

CROSS-REFERENCE TO RELATED APPLICATION

FIELD OF THE INVENTION

The present invention is related to receiving and storing reviews, and more particularly to fully integrating a social network with a review system to provide trusted reviews based on social network connections.

BACKGROUND OF THE INVENTION

A variety of methods exist today that allow consumers to write reviews of books, products, merchants, restaurants, and other topics. For example, Amazon.com allows customers to write reviews of products purchased from Amazon. EBay.com asks sellers and buyers to review each other, not on the actual product transacted, but on the quality of the transaction itself. Epinions.com, Shopping.com, and Bizrate.com focus on providing reviews of products and merchants to potential consumers, but do so as a shopping portal. Other sites that focus on specific verticals, such as DiamondReview.com, provide reviews only within the diamond jewelry industry.

For a buying consumer, reviews can be an important part of the purchase decision for a given product or service. However, the state of reviews found on the Internet today is such that many of the reviews cannot be fully trusted. Many reviews are written by sellers (or person's affiliated with sellers) that falsely pose as past buyers, and are therefore biased in favor of the seller. Since it is at best difficult, and usually impossible, to tell the good reviews from the biased reviews, the entire notion of using reviews to make a purchase decision becomes less useful than it could be. Therefore there is no existing system that provides trusted relevant reviews to consumers.

SUMMARY OF THE INVENTION

A system is provided that creates an optimal balance between the vendor's interests, the buyer's interests, and the review-provider's interests. The system can be used for any type of review, whether it is a review for a product, a service, a person, a work of art, or any other subject for which writing a review might be applicable and desired. The system is socially enabled as it considers each reader's social relationship relative to the author of each review, and considers such relationship when presenting the reviews to the reader. The system is also designed to allow true user-friendly solicitation of reviews by any merchant or other solicitor of reviews (called "subjects"). Furthermore, the system is designed to allow the subjects of any review to syndicate or broadcast their reviews through third parties, in a user-friendly and unrestricted fashion, but in a manner that preserves the legitimacy and authenticity of the review. Finally, the system is designed to address concerns about privacy and authenticity relative to the authors of reviews and the readers of reviews.

Embodiments of the present system include a review engine that is connected to support modules and databases that receive, store and retrieve reviews based upon the subject and the users' relationship to the authors of the reviews. The review engine comprises a social network engine, a rate and rank engine, a credentials engine and a privacy engine. These engines allow reviews to be sorted, filtered and ordered when presented to the user.

Numerous exemplary methods are also provided that include the reception and delivery of reviews to and from users of the system. The methods of providing reviews include allowing a user to search for reviews within the system and methods of automatically providing reviews based on a user's visit to a website.

BRIEF DESCRIPTION OF THE DRAWINGS

FIG. 8 is a diagram illustrating a locator data structure employed in an embodiment of the present invention;

DETAILED DESCRIPTION OF THE PREFERRED EMBODIMENT(S)

A system is provided that creates an optimal balance between the vendor's interests, the buyer's interests, and the review-provider's interests. The system can be used for any type of review, whether it is a review for a product, a service, a person, a work of art, or any other subject for which writing a review might be applicable and desired. The system is socially enabled as it considers each reader's social relationship relative to the author of each review, and considers such relationship when presenting the reviews to the reader. The system is also designed to allow true user-friendly solicitation of reviews by any merchant or other solicitor of reviews (called "subjects"). Furthermore, the system is designed to allow the subjects of any review to syndicate or broadcast their reviews through third parties, in a user-friendly and unrestricted fashion, but in a manner that preserves the legitimacy and authenticity of the review. Finally, the system is designed to address concerns about privacy and authenticity relative to the authors of reviews and the readers of reviews. The features, methods and structures of the exemplary review system are shown and described with reference to FIGS. 1-15.

Figure 1:
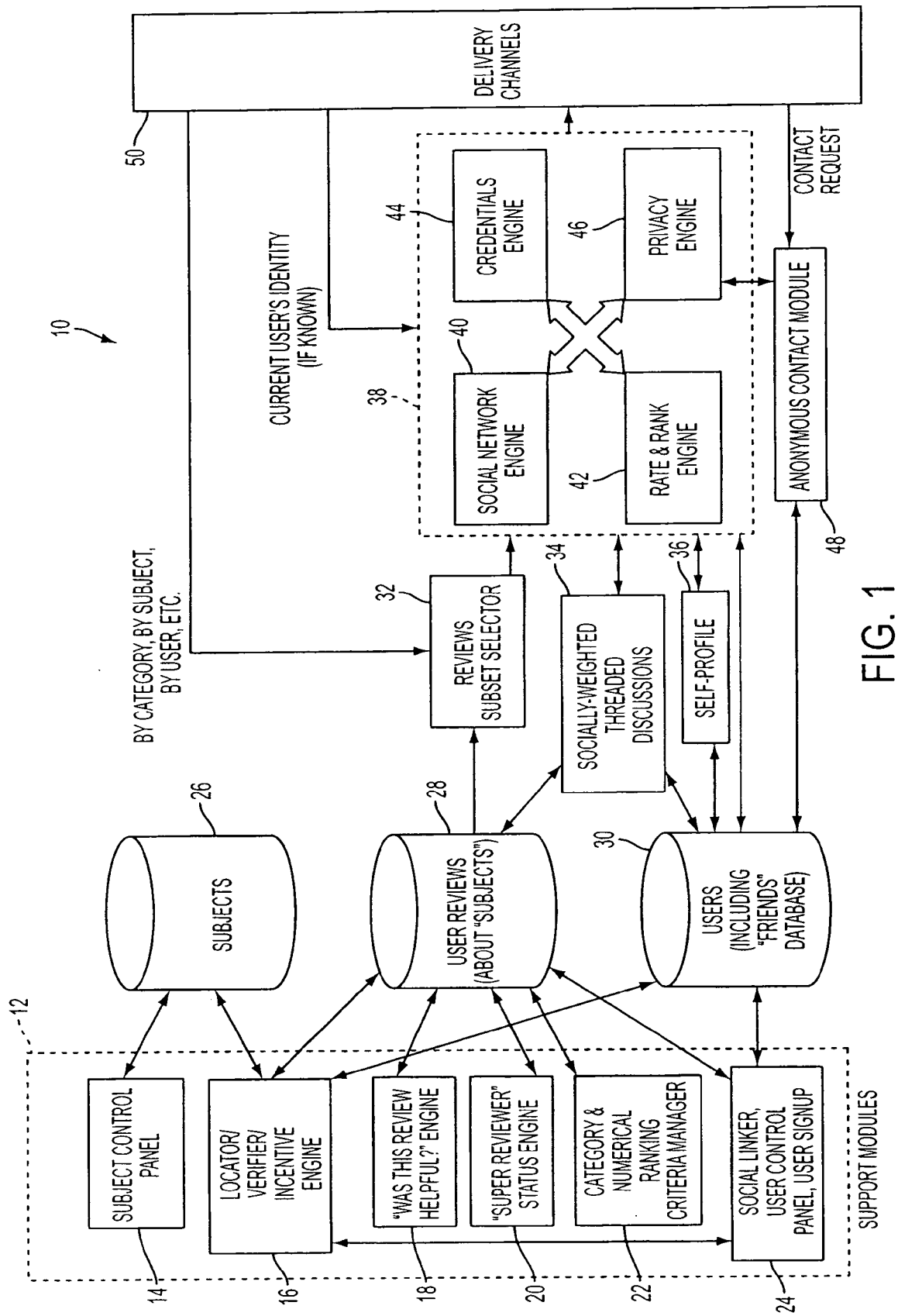
FIG. 1 is diagram of one embodiment of the present review system.

FIG. 1 shows an exemplary embodiment of the present system 10 that provides a broad platform for many different types of reviews. Reviews can be written about many different "subjects." A "subject" can be an online merchant (including a seller on an auction site), an offline merchant, a service (contractors, accountants, lawyers, doctors, classes, seminars, landlords, brokers), a product (movies, books, CDs, software, games, appliances), a person (as a potential romantic date, a potential friend, a potential business partnership, a potential employee, chat buddies, etc.), an employer, a buyer (to assess credit worthiness or other buyer attributes in a qualitative way), etc.

A user interacts with the exemplary review system 10 through the delivery channels 50. The specific details of a user interface that communicate through the delivery channels 50 are shown in greater detail in FIG. 15. The review system 10 contains a group of support modules 12 that include a subject control panel 14, a locator/verifier/incentive engine 16, a "was this review helpful?" engine 18, a "super reviewer" status engine 20, a category and numerical ranking criteria manager 22 and a social linker user control panel, user signup 24. Connected to the support modules 12 are a subject database 26, a user reviews database 28, and a users and friends database 30. Also connected to the databases are a reviews subset selector module 32, a socially-weighted threaded discussions module 34 and a self-profile module 36 and an anonymous contact module 48. These modules access and augment the data in the various databases to obtain the necessary information required by the engines of the review system 10 as subsequently described.

The system review engine 38 is comprised of a social network engine 40, a rate and rank engine 42, a credentials engine 44, and a privacy engine 46. The system engine 38 receives and transmits signals to and from the delivery channels 50. The engines 40-46 are all connected via data busses in a conventional manner. The signals from the delivery channels include the user's identity and the subjects and categories of input. The rate and rank engine 42 provides the calculations regarding social distance and final rankings of reviews provided to the user.

A review may be requested through the channels 50. If a review is requested for a given subject, it is first processed by the review subset selector module 32. This module directs the request to the appropriate database and retrieves the subset of reviews relevant to the subject. In addition to the request for a review, the requesting user information is also input into the system. The user ID information goes directly into the review engine 38. The review engine 38 comprised of the social network engine 40, the rate and rank engine 42, the credentials engine 44, and the privacy engine 46 work to provide an ordered list of reviews based on the stored reviews relating to the subject as ordered by a social distance as calculated in the review engine 38. The support modules 12 provide further inputs and information that allow the engine 38 to provide the most pertinent information regarding each user request.

A review can also be received and stored in a similar manner. A user may compose a review of a product sold on a website and wish to enter this review into the system. The review would be accepted into the system 10 through the locator/verifier/incentive engine 16. The review is then directed to and stored in the appropriate database. The user author information is also obtained and stored so a determination and calculation of social distance between a requesting user and the author may be obtained. The system 10 employs locator data structures subsequently described in order to process the reviews. In this manner, the system 10 processes reviews based on the subject, the author, and the requesting user's relationship to the author.

The system 10 can be used to display reviews publicly, a likely scenario for an ecommerce vendor. It can also capture reviews publicly, but not make them available to the public (similar to a typical suggestion box, where members of the public can submit suggestions privately to a merchant). Embodiments of the present system 10 can also be used strictly within an organization, with tightly controlled authorship and viewing rights managed by the privacy engine 46, such as soliciting 360-degree feedback of one employee to another. It can also be used to selectively capture and selectively disclose reviews, such as might be used by an employee to capture all employer references in a way that is validated by a third party (the review-provider), can live forever in time, and can be re-used at will without having to re-contact the provider of the reference. In a similar manner, the present system 10 can be used by applicants to academic programs, such as business or law school, where a reference is typically required. The present invention therefore maps a user's personal social network to products, services, vendors, buyers, sellers, potential business partnerships, and even potential romantic encounters that the user might be contemplating.

Figure 2:
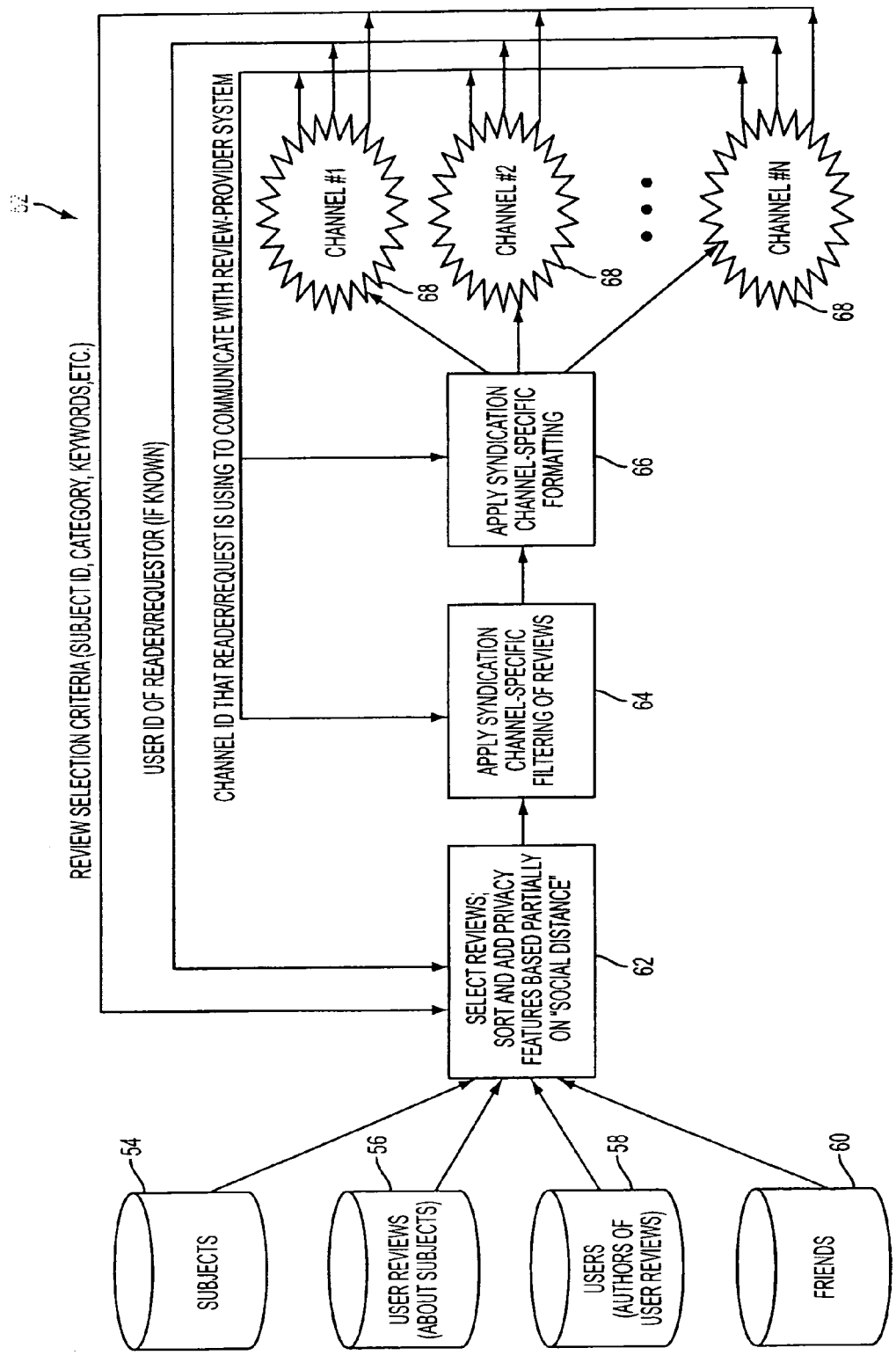
FIG. 2 is a diagram of another embodiment of the review system of the present invention.

FIG. 2 shows an exemplary embodiment of a multi-channel format syndication system used in the review system 10. The system 52 in this example contains a plurality of databases such as a subject database 54, a user reviews database 56, a users (authors of user reviews) database 58, and a users and friends database 60. Directly connected to these databases is module 62 that selects reviews, sorts and adds privacy features based partially on social distance. Also included in the system 52 are modules 64 that applies syndication channel specific filtering of reviews and module 66 that applies syndication channel specific formatting. Module 66 is connected to multiple channels 68 for communication. The types of channel specific filtering and formatting are determined by the type of electronic delivery system employed as subsequently described.

Figure 3:
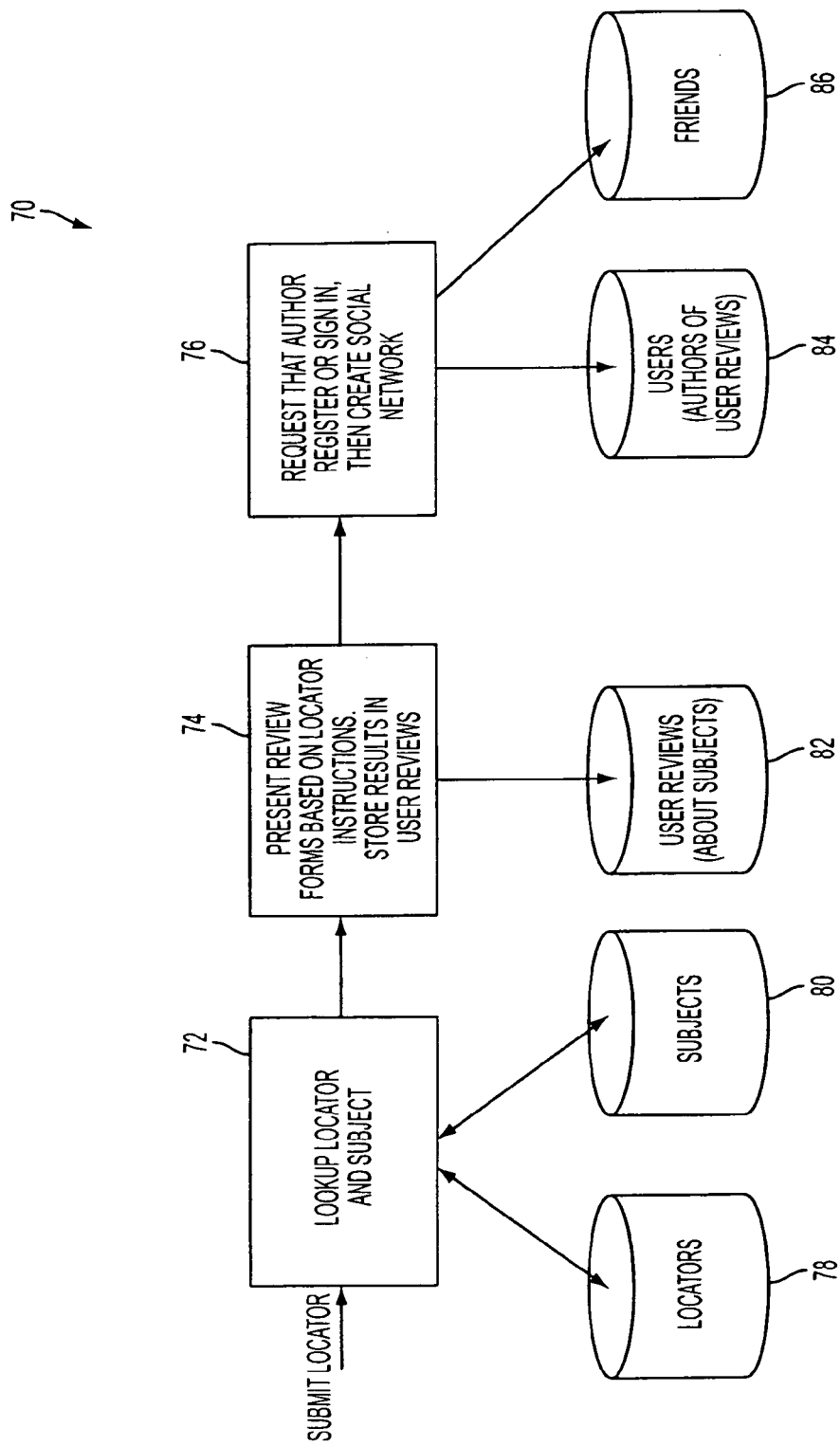
FIG. 3 is a diagram of another embodiment of the review system of the present invention.

FIG. 3 illustrates an exemplary review submission system 70 that employs a locator as would be used with the review system of FIG. 1. A locator is submitted by a user into the system via lookup locator and subject module 72. Module 72 accesses locators database 78 and references subjects database 80 (an exemplary record of database 78 is shown in FIG. 8). In module 74 the review forms are presented based on the locator instructions and the results are stored in connecting user reviews database 82. Module 76 requests that the author register or sign in, and then requests that the user submit information used to create a social network. Module 76 accesses user database 84 and friends database 86. Using this embodiment, a user's profile and social network are entered for further processing within the system 10. The locators used in the present system 10 connect users to subject and friends so that an almost instantaneous connection between users and databases may be obtained in order to provide real-time reviews to a user. The features and methods provided by FIGS. 1-3 are described below.

Once a user's social network is provided to the review-provider system 10, the review-provider maps that user's social network to other user's social networks, creating a tree-like structure with the user at the top of the tree, each node of the tree representing a person, and every connection of nodes representing a degree of separation. The "social distance" between any two people is equal to the shortest path between the two people in such a tree.

An additional overlay to the social network is to request each user to describe the relationship with each "friend"

submitted to the network. For example, if the user describes person A as a "spouse" and person B as a "co-worker," there is a clear hierarchy of trust despite an otherwise equal "social distance." Furthermore, such relationships can enable otherwise impossible privacy options that allow the users to share reviews with people that are multiple degrees of separation away, yet not breach the person's actual identity.

The present embodiments of the system 10 map the concept of a social network into the notion of reviews. The system 10 offers reviews by friends, by friends of friends (2 degrees or separation), by friends of friends of friends (3 degrees of separation), and so on, in addition to any reviews offered by recognized experts and by strangers. Whenever reviews are presented to a user via the review engine 38, the reviews are sorted based on the "social distance" between the reviewer and the user. The "social distance," as previously described, is simply the number of degrees of separation between the reviewer and the user, based on the user's and/or the reviewer's social networks.

Figure 4:
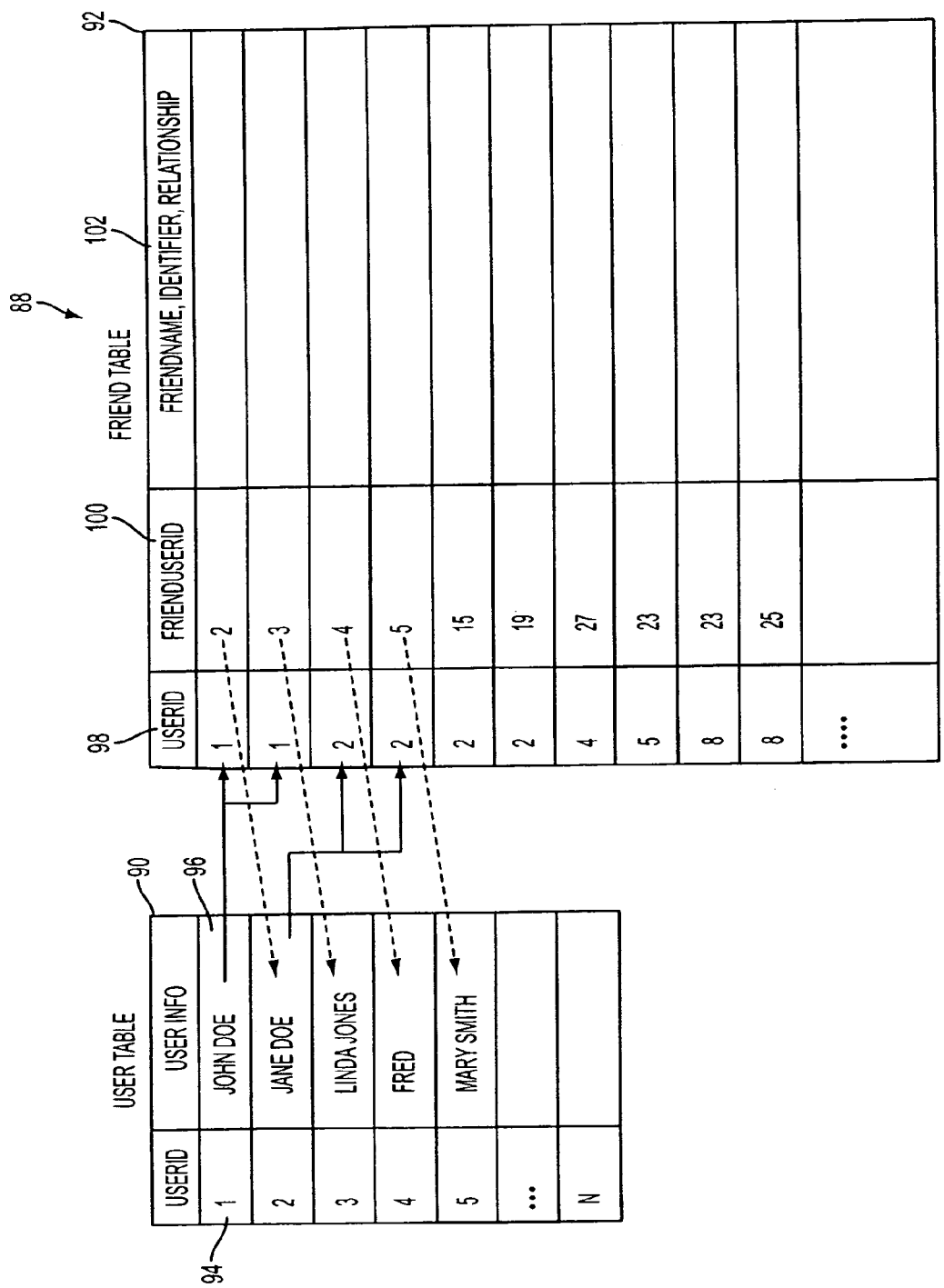
FIG. 4 is a diagram illustrating exemplary data stored in the review system of one embodiment of the present invention.

A social network can be implemented in the system 10 as described above with two data structures 88 as shown in FIG. 4. The data structures 88 can be implemented as a memory array, as an SQL table, or any other practical method. The first data structure consists of a user table 90, which contains a unique userID number 94 for each user of the review-provider system, as well as any additional information 96, such as name, email address, or any other appropriate and relevant registration information. The second data structure consists of a friends table 92, which contains pairs of userID numbers 98 and friend-userID numbers 100, and any other relevant information 102 such as relationship, names, etc. Each pair of userID numbers 98 and 100 consists of two users who have established a link as a "friend" in the social network. Therefore, if a pair consists of (1,2), representing userID #1 and userID #2, this represents 1 degree of separation between userID #1 and userID #2.

A social network can be formed from any number of unique or nearly-unique identifiers to people, such as phone numbers, social security numbers, or email addresses. Some of these identifiers can be used in combination, or in combination with secondary identifiers such as name and address. When the user registers to become a member in the review-provider system 10 (as in FIG. 3), the user is given the opportunity to submit their social network, in the form of a list of unique or nearly-unique identifiers to people whom the user considers to be a friend. This is accomplished by asking the user to manually enter information such as email addresses, or can be automated by retrieving a user's contact information from any number of existing repositories such as the contact list on the user's email/contact software (such as Microsoft Outlook or Palm Desktop), online email provider (such as Yahoo Mail), other device (such as a cellular phone or PDA containing such information), or provided in metadata format such as FOAF (http://www.foaf-project.org).

A social network can be augmented by capturing the relationship between people and groups of people. For example, if a person works at a particular company, she will have a slightly higher amount of trust for that co-worker than she would if that person were a complete stranger. This is true even if there is no formal social connection between her friends and the co-worker's friends (i.e. "infinite" degrees of separation). The same assertion can be made for people who study at the same university or school, are members of the same alumni network, go to the same church, attend the same social events, pursue the same hobbies, are members of the same professional or leisure club, etc. The invention allows users to add groups of people as friends in the social network. The group of people is identified in aggregate as a single company, university, or any other appropriate identifier.

Figure 5:
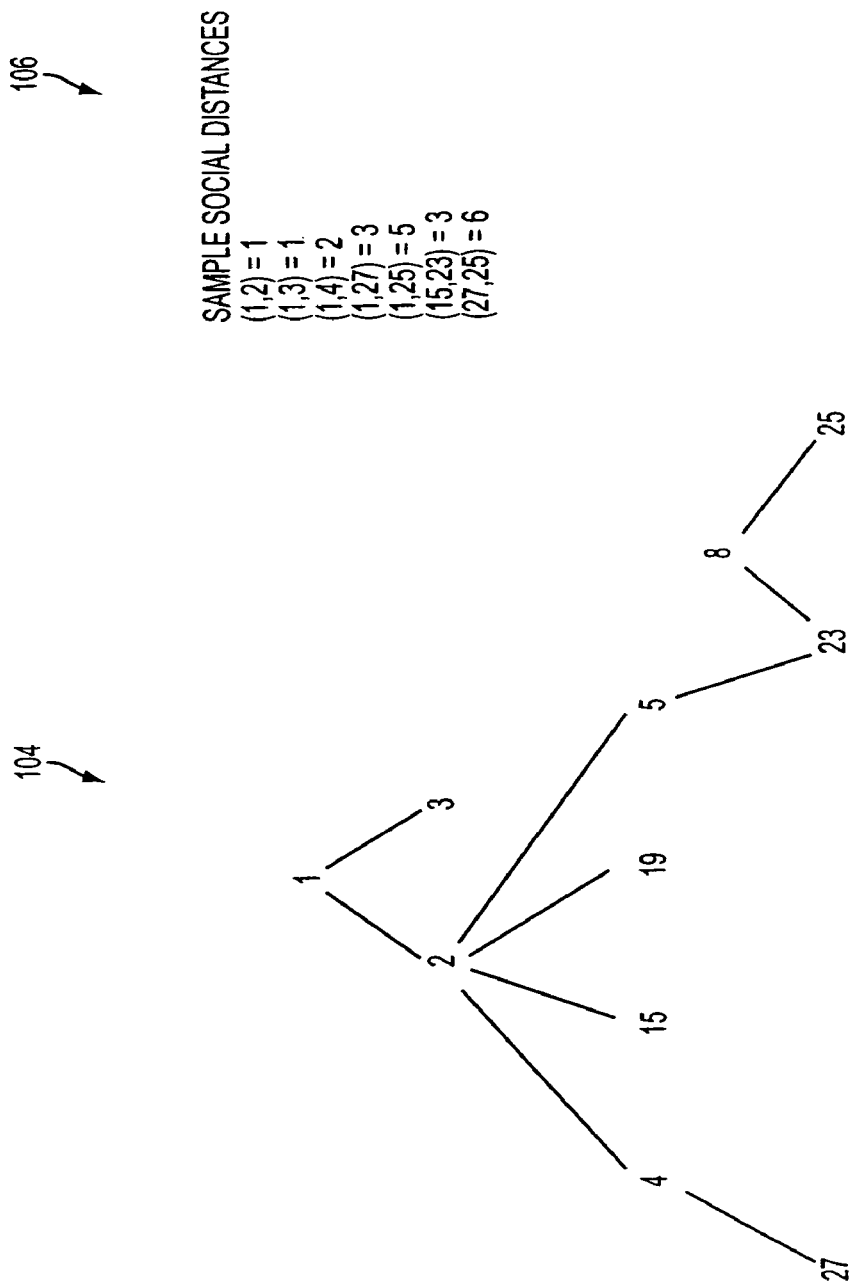
FIG. 5 is a diagram illustrating an exemplary social network and social distances that may be employed in the present invention.

Multiple pairs 98 and 100 are combined in a tree-like structure to establish a given user's social network, as shown in FIG. 5 for the sample data set shown in FIG. 4. FIG. 5 shows an exemplary tree-like data structure 104, along with the sample social distances 106, as shown in the tree 104. In this example user 1 is friends with users 2 and 3. User 2 has friends 4, 15, 19 and 5. User 4 has friend 27, while user 5 has friend 23. User 8 is friends with 23 and 25. The social distances 106 refer to the number of connecting lines between users. For example, to connect user 15 to 23, three connecting lines must be made, therefore the social distance is three.

Figure 6:
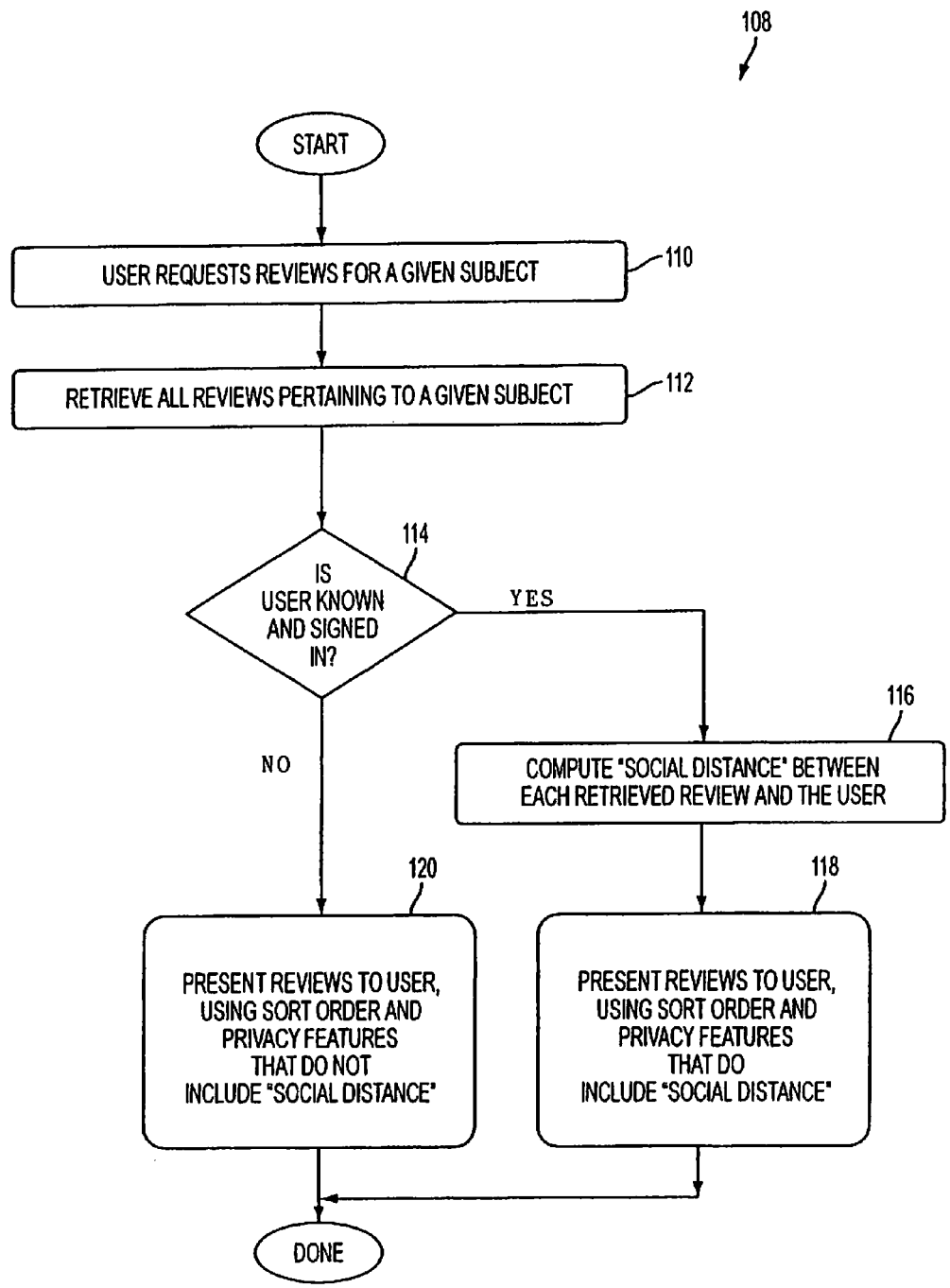
FIG. 6 is a flow diagram illustrating an exemplary process of providing reviews in one embodiment of the present invention.

Using the exemplary social network information as above, whenever a user requests reviews for a given subject, the computer review system 10 executes an exemplary process as shown in FIG. 6. After starting the process enacts step 110 where a user requests reviews for a given subject. All reviews pertaining to the given subject (excepting those that may be filtered as disclosed later) are selected in step 112. In step 114 it is determined if the user is known and signed in. If the user is registered and signed in and the user's userID becomes available to the review-provider as part of the query, either through a cookie or any other means, the "social distance" of each selected review is calculated in step 116 with respect to the user; the reviews are displayed in sorted order and using privacy settings that include "social distance" in step 118. If the user's userID cannot be determined, step 120 is enacted where the reviews are displayed in sorted order and using privacy settings that do not include "social distance." It is noted that other embodiments of this process 108, particularly with regard to the sequence (for example, the retrieval and reviews and the computation of "social distance" can occur nearly simultaneously), and that there are many ways that the "social distance" can be used to influence the sort order and/or the privacy settings of the reviews.

Another feature and embodiment of the invention is the overlay of threads in message forums. Module 34 in FIG. 1 includes messages or entire threads of messages into the system 10, so when the user requests a review on a particular merchant, product, etc., the likelihood that the user will find a friend who has commented on the subject at hand will increase. When this happens, an entire message thread can be considered to be of the same "social distance" as the author of the thread with the smallest "social distance" to the user, therefore bringing additional trusted information to the user.

In addition to separate review forums, it is possible to tightly integrate a message forum to the review system 10. In such an implementation, the initial review would serve as the initial message in a "thread" of messages. Different users would be able to post and reply to the thread, thereby adding many messages and comments to the initial review. The subject about whom the review is written would, in some cases, be able to control whether an integrated message forum is permitted for their reviews, and who may post on such a forum (only the subject, only the subject plus author of the review, only registered users, everyone at large, etc.). A "social distance" can be computed between the author of each message in the thread, and the user viewing reviews, and then provide the reviews and comments in sorted order based partly on the "social distance."

Embodiments of the present invention therefore provide a search function where the documents (web pages, PDF files, etc.) would be sorted both by relevance based on keywords (well known in the art), other metrics (such as Google's PageRank method), as well as by the "social distance"

between the authors or other endorsers of said documents and the user performing the search.

This significantly increases the value of the documents retrieved, since the trust level of the source of the documents would be higher.

For example, if a user searches for "books" and the review search engine 38 finds 25 book providers, the results would be sorted based on a metric at least partially related to the "social distance" of the reviews that are written for each of the 25 book providers. Therefore, if a close friend of the user had recently experienced a given book provider and written a review, that book provider would be listed first, and the user would be able to read his or her close friend's review on that book provider as part of the search result.

An additional feature of this invention is the overlay of a category search within the system 10. For example, if a user is looking for "Chinese Restaurants in Mountain View, Calif.," the results would be retrieved and sorted based on a metric at least partially based on the "social distance" of the reviews written for each of the restaurants that fit the category criteria.

An additional implementation and embodiment of the invention is an overlay for RSS feeds and blogs, where the links would be sorted based partly on the "social distance."

One of the most formidable challenges in collecting reviews is the mere act of motivating customers and system users to write reviews. The most opportune moment for a customer to write a review is within a few days after the sale is completed, the product is first used, or some other substantial experience with the subject has occurred that empowers the customer to write a review. Depending on the nature of the product or service and how it was purchased, many different collection methods are appropriate.

Figure 7:
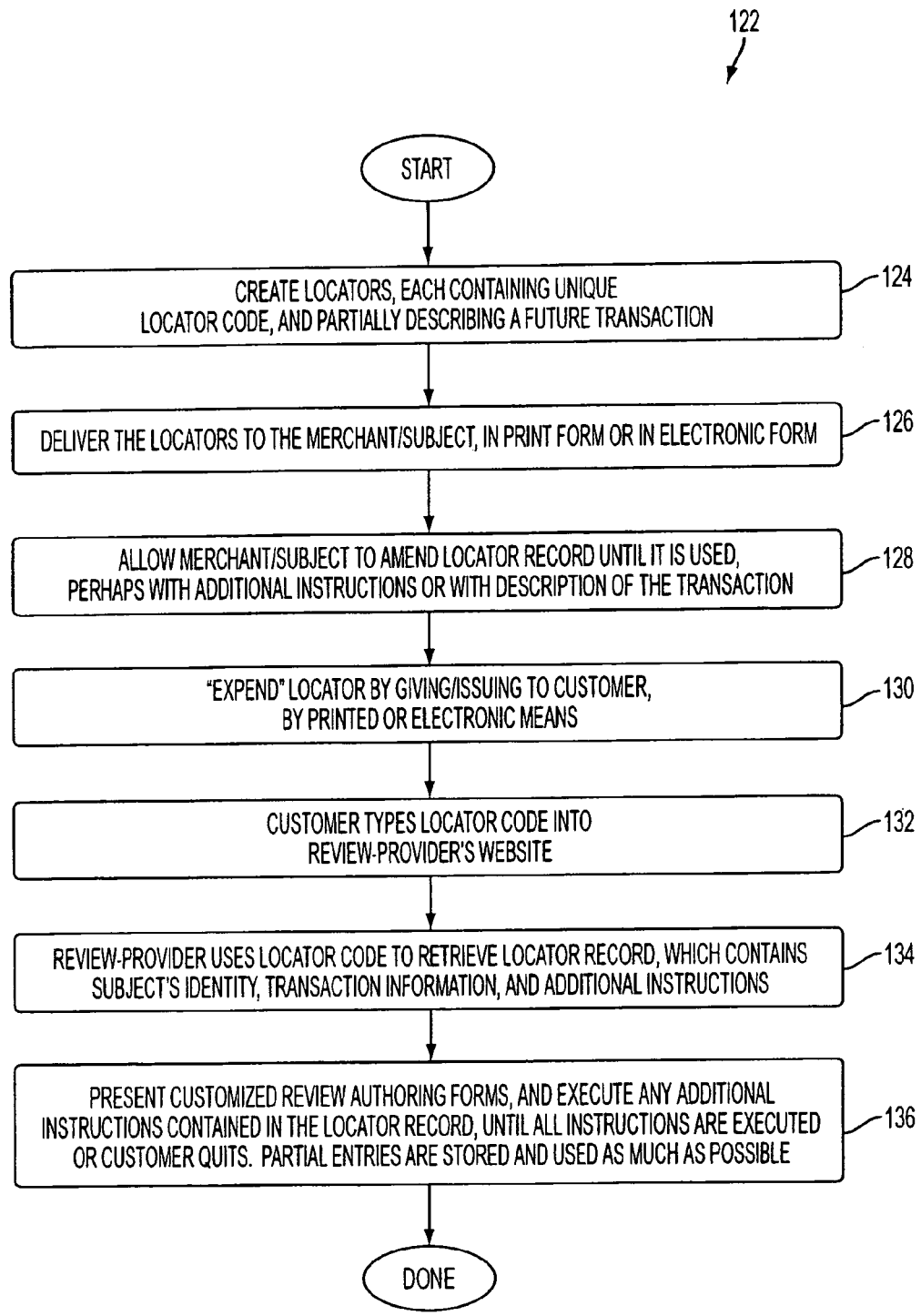
FIG. 7 is a flow diagram illustrating an exemplary process obtaining reviews in one embodiment of the present invention.

An exemplary method 122 of collecting reviews is shown in FIG. 7. After starting, step 124 is enabled where the subject first requests that the review-provider create a finite set of locators, each containing a unique locator code comprising of a set of alphanumeric characters, and perhaps partially describing a future transaction (the minimum description would simply include the identity of the subject). Upon request in step 126, the review-provider generates the locators by creating random but unique alphanumeric sequences, creates a database record, and delivers the codes to the subject, in either print form or in electronic form. The print form is useful for brick and mortar merchants, whereas the electronic form is useful for online merchants, but the two are interchangeable. The system and review-provider allows the subject to amend the locator record only between the period of time that a given locator code is created, and when it is used or expended by a customer in step 128. This allows the subject to add transaction information to the locator record upon issuing the locator code to a customer in step 130.

Once a customer obtains a locator code from the subject, the customer goes to the review-provider website and types in the code in step 132. Optionally, the subject can deliver the locator code electronically, such as contained within a URL. Assuming that the locator code is contained in the review-provider's database, the locator code causes the database to retrieve the identity of the subject, any transaction-level information including the person's name, and any additional instructions in step 134. Based on the information retrieved, the customer is presented with forms that allow the authoring of a review in step 136. Using the additional instructions, it is possible to ask the customer to write additional reviews on specific aspects of the transaction, to ask the customer to register to become a registered user of the review-provider system, to ask the customer to create a social network within the review-provider system, to grant coupons or other incentives to the customer as a reward for completing a review or other tasks as specified in the instructions, and any other instruction. The fields in the locator record containing the transaction-level information and the additional instructions can be implemented in many ways, but a convenient way is to use XML or any other data format that can store metadata.

FIG. 8 shows an exemplary locator code record 138 that would be used in the present system as shown in FIG. 3. The record contains a locator code 140, a subject ID 142 corresponding to a subject, an identifier 144, and additional instructions 146. Additional locators 148 are also stored that may reference additional subjects or locators for example. Each code within the locator database 78 allows quick access to the appropriate friends and reviews databases stored within the system 10. This allows for real-time processing of information by the system 10 and reviews to be accepted from and provided to the user.

One variation of the method of FIG. 7 would be for brick and mortar merchants or service providers who perform most of their transactions without the use of the Internet, to create a paper cards, each card containing a unique locator code (printed by the review-provider or the seller) and issue such cards to each customer with every purchase or transaction. The card would contain simple instructions for the customer to visit the review-provider's website and submit the locator. After the customer submits the locator code, she would be presented with the electronic forms necessary to complete the requested review. Under this basic system, it would not be possible to include transaction-level information such as the customer's name or what the customer purchased, unless the customer submitted that information as part of the review.

Another embodiment of the above system and methods would be to include the locator code on the cash register receipt of every purchase. While this requires tighter initial integration between the seller's point of sale system and the review-provider, once the integration work is complete the system becomes truly seamless for the seller, and the inclusion of transaction-level information and customized additional instructions into the locator record can optionally be automated.

Another exemplary use of the above embodiments that is possible for brick and mortar merchants would be for the merchant to transmit names, email addresses, and any other transaction-level information to the review-provider on a regular basis (hourly or daily) of all transactions completed during the period. The review-provider would then generate a locator code, combine the locator code with the transaction information provided by the merchant, and generate and send an email directly to the user, requesting a review, and containing the unique locator code.

An online merchant could use the embodiments of the invention to transmit the locator code electronically to customers, such as sending an e-mail message to customers containing a unique URL which contains a hyperlink to the review-provider website and the locator code. After the customer clicks on the hyperlink, they would be redirected to the review-provider website and presented with the electronic forms necessary to complete the requested review.

Another exemplary use of the method of FIG. 7, appropriate for transactions completed entirely online, would be for the merchant to direct the user's browser to the review-provider's website at the conclusion of a purchase. Part of the redirection would pass transaction-level information to the review-provider. The review-provider would then request the review from the user, without the need for a locator code at all.

Another example of the present system that would be appropriate for manufacturers of products is to include a card with a locator code inside the actual product, perhaps along with the warranty/registration procedure (or perhaps even as part of such a procedure, which might be triggered as part of submitting the locator, as an additional instruction as described previously). In this variant, the inclusion of the card containing the locator code would be at the point of manufacturing the product, not necessarily at the point of sale.

The various exemplary methods presented here offer several advantages that become critical to increasing the likelihood that the user will complete the review process. First, it minimizes data entry and lookups that need to be performed by the user. All the user must do is visit a website, type in a locator code, and then follow the prompts. Second, because the nature of the transaction and seller are known (due to entry of the locator code), only relevant questions are asked of the reviewer. Third, at the end of the review, the seller can optionally offer a reward to the user for completing the survey. Fourth, because many sellers would use this exact method and only the locator codes would vary, this would become a familiar usage pattern for consumers, thereby reducing first-time anxiety in using the system.

Aside from increasing the likelihood of completing the review, this process also offers the advantage that users who submit reviews are already pre-validated as a user who has made a bona-fide purchase from that seller. This eliminates the possibility of a fraudulent or false review, thereby increasing the overall faith that users will place on the system 10. This feature can be strengthened by having the merchant submit to the review-provider the name or other identifier of the person to whom it issued a specific locator code, before that person writes the review, as part of the transaction-level information in a given locator record. When that person writes the review, the review-provider can then verify that the person's name matches the name that was provided (and explicitly authorized) by the merchant to write the review. Matching can be done within the system 10 using any number of "fuzzy logic" techniques that match a person's name or other non-precise identifiers, including multiple such identifiers (a non-precise identifier is a person's name; whereas a precise identifier would be their social security number or their email address).

The present embodiments therefore allow the capability to add transaction-level information to a given locator. The Subject/merchant can specify the name, email address, telephone number, or any other identity information of the person who made the purchase and is therefore authorized to complete the reviews and additional instructions. If a person matching the name as submitted by the subject completes the task, the reviews can be marked as "verified" by the review-provider system 10, and this can be communicated to any reader. The name can be matched using a soundex function (or similar fuzzy logic), and the subject can "appeal" an incorrect matching, which will then be approved or disapproved manually by the staff of the review-provider.

The capability to add additional instructions to a given locator code is also a feature of the present system 10. For example, if a user buys a digital camera from a given online vendor, the single locator can trigger one review for the digital camera itself, another separate review for the online vendor, and yet a third review for the customer service representative who assisted with the purchase of the camera. Another instruction would be to request that the customer register to become a registered user of the review-provider, and then to create a representation of that user's social network.

A locator as shown in FIG. 8 can have an expiration date, after which time the locator cannot be used (if it has not been used already). The subject can cause the review-provider to generate a set of locator-codes using the review-provider's website as an ordering kiosk.

The review-provider system 10 can meter the generation of locator codes, and can either limit the number of locator codes that can be generated within a specific period of time or for a specific subject, and/or can charge money for the generation of locator codes.

In the absence of a locator code, it is still possible to for the system 10 collect reviews that a user wishes to contribute. These reviews would be marked as "unverified" or some other such appropriate symbol, meaning that they were not solicited by the merchant and were contributed entirely voluntarily. This is the status quo in most review-providers today, and invites fraudulent negative reviews by competing merchants, as well as fraudulent positive reviews written by the merchants about themselves. To make this system 10 somewhat more resistant to this type of attack, a credit card authorization can be optionally used, wherein the user verifies his or her identity but does not incur an actual charge to the credit card (described later).

If, during the process that a user submits a review, the user fails to complete the registration or sign-in process, the review is still retained and used, but anonymously. Furthermore, a persistent cookie is placed in that user's browser with a unique identifier to that review. If the person ever visits the review-provider's website again and does sign in or register, any and all reviews that are anonymous but that were authored from that browser (and assuming the cookie is still in place) are automatically assigned to that user as the author.

Once reviews have been written, it is desirable to be able to retrieve the reviews in several different ways, within one centralized area, usually the review-provider's website. The "search box" metaphor is used, except the search box is overloaded with additional retrieval-oriented functionality that is invoked when the user formats the query in specific ways.

Various types of uses and interfaces are therefore provided by the present invention. The interfaces would be generally provided by a display as detailed in FIG. 15. The interface may include a "search box" to allow a user to interact with the system 10. Referring to the method of FIG. 6, if a user types the word "diamonds," the system would return all subjects that either contain the word "diamonds" or are perhaps related in some way.

Another way to use a search box is for the user to submit a unique identifier to the subject. There are a number of unique identifiers available to merchants and service providers: Web site URL and phone number (with area code). For products, the UPC code is the best available unique identifier (which may be automated by scanning the UPC). For individuals, the social-security number is one good unique identifier, as is an email address. Furthermore, the review-provider can assign unique identifiers to subjects, including numbers or keywords. Whenever a unique identifier is submitted, the system automatically retrieves all reviews for that given subject.

Another embodiment of the system 10 regarding the use of a search box is to submit a location. This can be done manually (type in an address or latitude/longitude), or can be done automatically with the assistance of a GPS receiver. If the location submitted matches with a subject, the review information is returned by the system. Location can be matched by address, or by coordinates. In the case of coordinates, the submitted coordinates would be compared against each subject's coordinates along with a bounding function that describes all other possible coordinates that fall within the subject's physical location (or nearby), and if a match is made, the review information is returned by the system.

A further exemplary way to use the search box is for the user to submit a locator code. When a locator is submitted, the system automatically recognizes the entry as a locator code, and proceeds to collect the review from the user following the instructions in the locator record corresponding to the submitted locator code. In addition to providing reviews, the system 10 aggregates certain functions and information that significantly enhance the value of the reviews Referring again to FIG. 1, a variation of the embodiment of the system 10 is the addition of editorial reviews (apart and separate from user reviews). By definition "editorial" reviews are provided by recognized experts in the given field. An editorial review function allows the subject to individually request any known expert to submit a review. This is accomplished by issuing a locator code to the expert. After the expert writes the review, the subject can move the review to a special area reserved for "editorial reviews." The identity of the person who writes such a review is disclosed to the extent that the author permits, just as in normal reviews; however, because the subject requested the review from that person, the subject may also request that the person allow full identity disclosure of that particular review. Any user who reads that review will assign trust commensurate with the fame and credentials of the given expert.

Another value-added function is the addition of credentials and certifications issued by third parties that is provided by the credentials engine 44. For example, TRUSTe (http://www.truste.org) offers certification of privacy practices; likewise, the Better Business Bureau (http://www.bbboline.org) offers certification pertaining to ethical business practices. There are also other third-party certification agencies that pertain to specific domains; for example, the Jewelers Board of Trade (http://www.jewelersboard.com) that assigns credit ratings within the jewelry industry. The system 10 therefore also provides these certifications with the review information.

The rate and rank engine 42 provides the function of assigning an overall rating number to each subject. This would allow users to quickly rank the providers in a given category, if such a ranking were desired. The overall rating number is computed individually for each user that utilizes the review-provider system, using metrics that include the "social distance" (as already disclosed) between the reader/user and the aggregate of all authors that have written reviews applicable to that subject. Other metrics that may be used in conjunction with the "social distance" include the rating assigned by each author, how/whether the author has been identity-authenticated, and how/whether the author was pre-authorized by the subject (by issuing a locator code).

The support modules 12 add further features to the system 10 by adding questions and rating criteria for reviews that are known to fall within known categories. For example, if a user is asked to write a review for a diamond jeweler, appropriate questions and rating criteria that would augment the value of the review include selection of rings, appropriate lighting in the showroom, convenient store hours, and other domain-specific questions and criteria. The system 10 includes a system that allows subjects to be categorized; as such, when a user submits a locator code, the category is retrieved along with the subject's other information, and based on the category, additional questions and rating criteria are retrieved and presented to the user. An extension is to allow individual subjects to augment and add questions and rating criteria to their own reviews, above and beyond any augmentation that might occur based on the category. This is all enabled by the novel ability to add additional instructions to the locator record.

The present embodiments therefore offer and facilitate a high degree of customization the pages in which their reviews are contained, by the subject, for aesthetic reasons. The review-provider could provide a special version of a site builder to subjects that would allow the creation and building of the pages, by adding "drag and drop" components that are specific to the review-provider. These components include actual reviews, credentials, logos, descriptions, directions, and similar. It is important to emphasize that the tool would only allow the subject to control the placement and aesthetics of reviews and credentials, not actually modify the content of the reviews or credentials. Other components that would be useful for subjects that happen to be merchants include methods to make contact or send in a request; furthermore, these requests could be seamlessly integrated to a CRM functionality that could be provided as an additional tool or by a third party CRM vendor.

Once a review has been written about a given merchant, product, or other subject, it is desirable that the review be disseminated as widely as possible. To that end, the present invention includes a flexible syndication system that permits the review to be easily distributed to an unlimited number and variety of different websites, devices, and other media. Furthermore, whenever possible, the presentation of such reviews should be customized to the media, website, or device being used by the user to view the reviews. This means that in addition to a "social distance" metric between the viewing user and each review weighing significantly into the sorting and presentation of the reviews that are chosen to be displayed for that user, the aesthetic presentation of the reviews is customized to the syndication channel, both for to the physical affordances offered by the channel (such as a small display in a portable device), as well as the business needs governing the channel (such as the front page of the merchant's own website).

Figure 9:
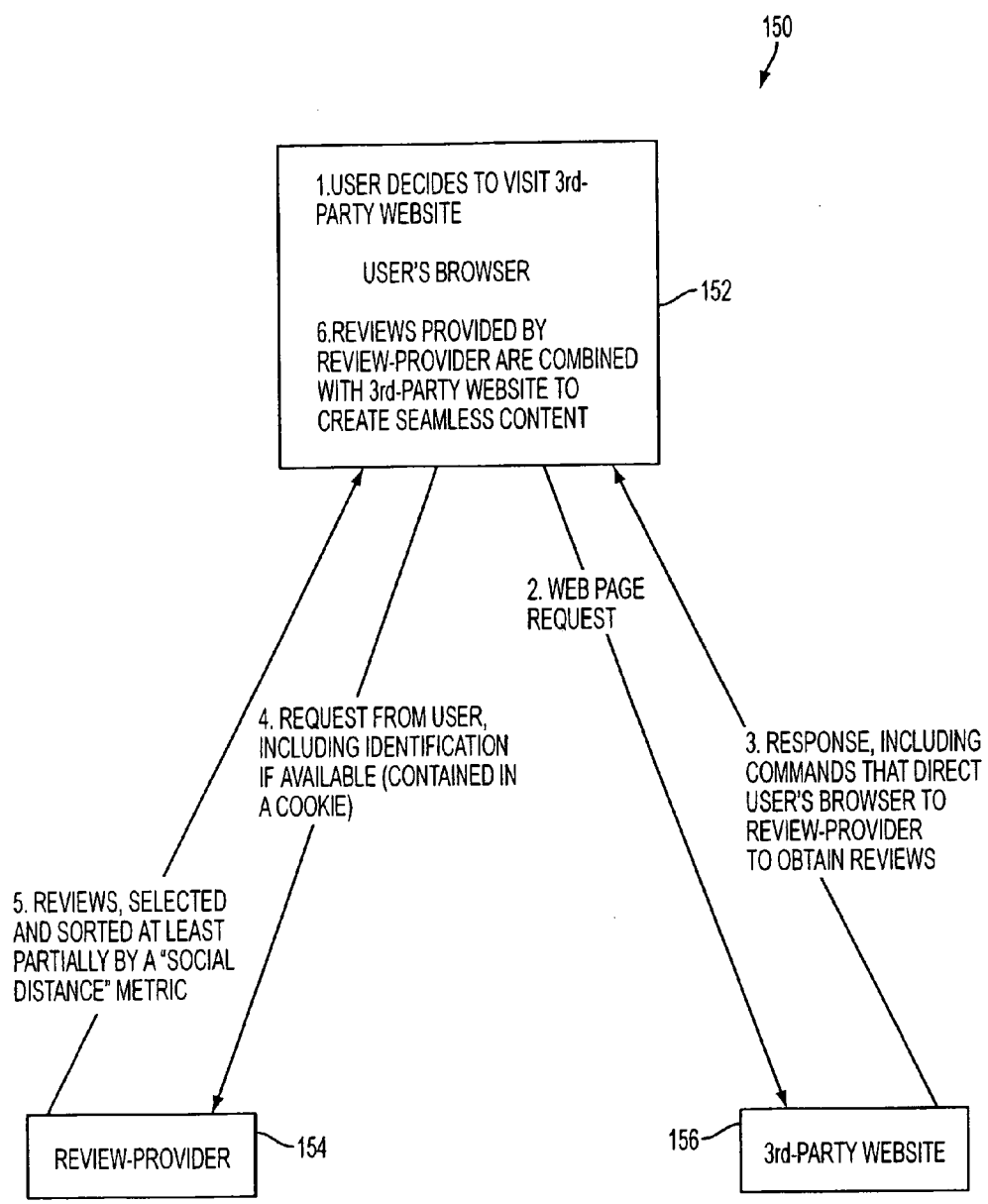
FIG. 9 is a diagram illustrating exemplary information flow within an embodiment of the present review system.

In addition to the numerous examples described above, FIG. 9 also shows an exemplary embodiment of the present invention. In this example, an implementation of a multi-format syndication system 150 involves three separate computing entities as shown in FIG. 9, the user's browser 152, the review-provider's server 154, and the third-party website 156. Steps 1-6 indicate flows of information or actions within this system 150. In FIG. 9, a user with an Internet browser such as Netscape Navigator or Internet Explorer visits a $3^{rd}$-party website (1, 2). The $3^{rd}$ party website delivers content as customary (3), but as part of its content it delivers a client-side script (such as JavaScript), frames, or any other command or technique that will initiate contact between the user's browser 152 and 154 the review-provider's server (4). The transmission that occurs in (4) includes, if available from a previously stored persistent or semi-persistent cookie in the user's browser or by other client-side means, the user's unique identity. Furthermore, the part of the transmission in (4) includes a request for specific reviews or category of reviews, based on the content that was sent to the browser by the $3^{rd}$-party website. The review-provider's server 154 retrieves the reviews from its database, computes a "social distance" between the user and each review's author, and then returns the list of reviews, sorted and presented at least in part by the "social distance" (5). The review content is merged with the content at 152 the user's browser (6), and the user perceives that all the content is coming from the $3^{rd}$-party website 156. However, the content of the reviews is customized for that user, and shows the most relevant reviews first. If a different user visits the 3<sup>rd</sup>-party website 156 at the same time, the content served by the review-provider's server 154 will be customized to that different user. Of course, if a user is not known to the review-provider's server, the content is presented in a default manner that does not include any "social distance" metric.

The third-party website 156 might consist of (perhaps competing) review providers, information websites, the subject's own website (such as a merchant), or any other website. This same technique can be accomplished in many different ways than shown above. The third-party website 156 may communicate directly with the service-provider's server, and retrieve information that would then be passed through the third-party website to the user, therefore obviating the need for a connection directly between the user and the review-provider's server (such connection is shown in dashes to indicate that it is optional).

Figure 10:
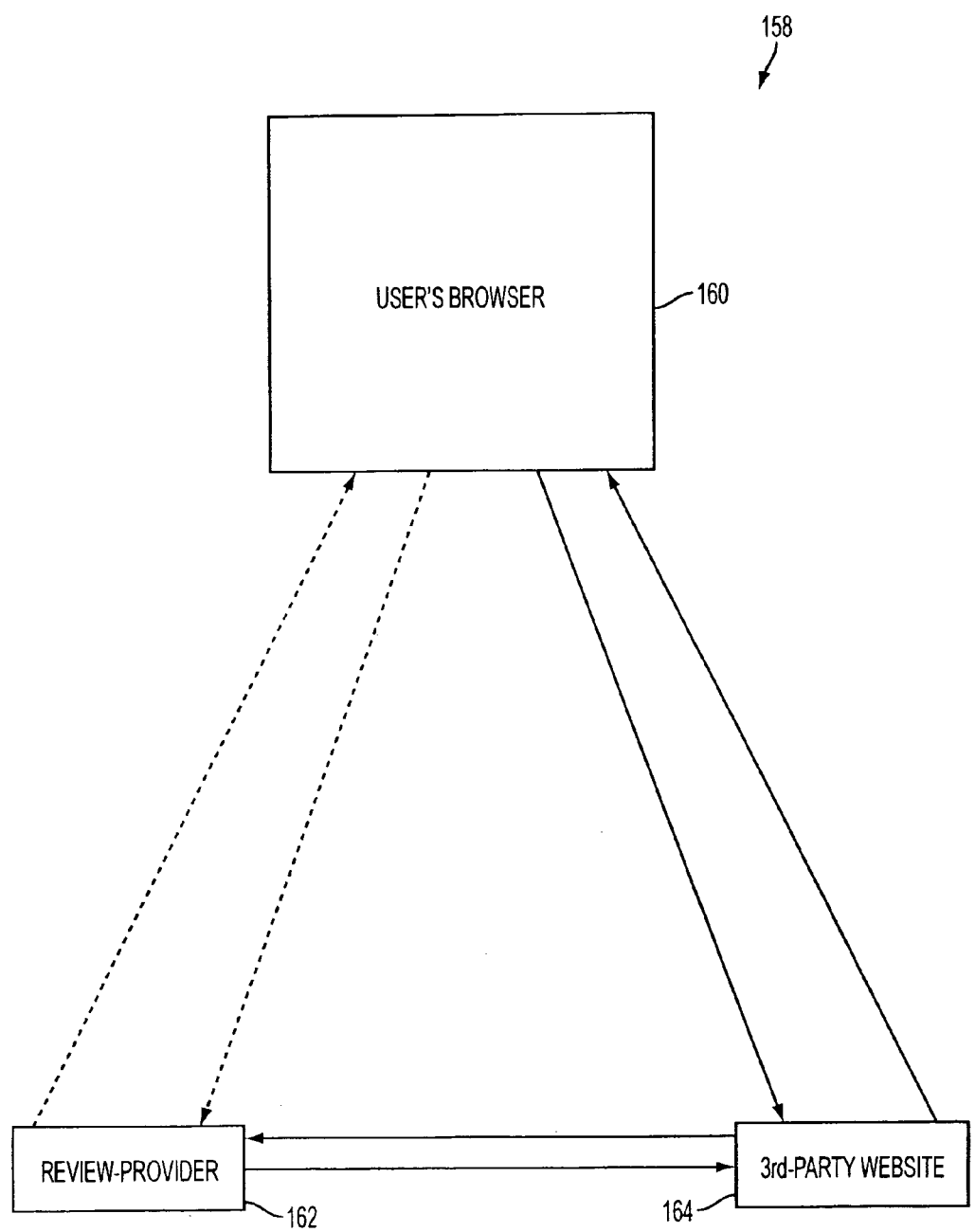
FIG. 10 is another diagram illustrating exemplary information flow within an embodiment of the present review system.

FIG. 10 contains another diagram 158 of the possible flow of information that could be used to implement this invention. This system contains the user's browser 160, the review-provider's server 162, and the third-party's website server 164. Furthermore, there are a number of additional transmission and presentation methods such as RSS, web services, frames, client-side scripts, browser toolbars, etc., that should all be considered equivalent and inter-replaceable for purposes of this invention. Furthermore, a review-provider's server 162 is not required if all of the review data is contained in the 3<sup>rd</sup>-party website server 164. Likewise, a 3<sup>rd</sup>-party website 164 is not required if all of the content and review data is being served by the review-provider's server 162. Lastly, the user browser 160 can be generalized to any client software running on any device capable of being connected to a digital network (such as a cellular phone or PDA).

In one implementation, the user simply visits the review-provider's website 162 and requests reviews for one specific subject (merchant, product, etc.), for a given category of subjects, for a given location, for a given keyword combination, or any other criteria of similar nature. The reviews that are relevant to the user's request are selected from a database, and the presentation is sorted by a metric that includes "social distance."

In another implementation, the 3<sup>rd</sup>-party website 164 is the subject's own website, such as a merchant that wishes to display its reviews to all customers that visit the merchant's website 164. It would be feasible and highly desirable to include all reviews directly on the "home page" of the merchant's website 164, and to have those reviews sorted and presented at least partially by "social distance." The net result would be that if person A visits the merchant's website 164, they would automatically be presented with the reviews written by person A's friends, friends of friends, etc., in sorted order by a metric that includes "social distance."

Another application of the multi-format syndication system is for advertising. Whenever a merchant wishes to advertise his or her products and services, part of the advertising could contain the title and author of a small subset of reviews, presented and sorted by a metric that includes "social distance." Referring back to FIGS. 9-10, the "3<sup>rd</sup> party website" in this case would be an advertising provider's website 164 such as Yahoo.com or About.com.

Figure 11:
FIG. 11 is an example of data and reviews provided by an embodiment of the review system.

The net result is that every advertisement would be directly targeted at the user who is viewing such advertisement, presenting that user's friends' reviews alongside the merchant's logo or other promotional message. An example of a promotional message 166 provided by the present system is shown in FIG. 11. In this example, friends Linda Jones and Tom O'reilly have stored reviews relating to Doe Jewelers, and these reviews have been automatically provided by the system. This promotional message 166 would be displayed on a user's computer screen as described with reference to FIG. 15 for example.

Figure 12:
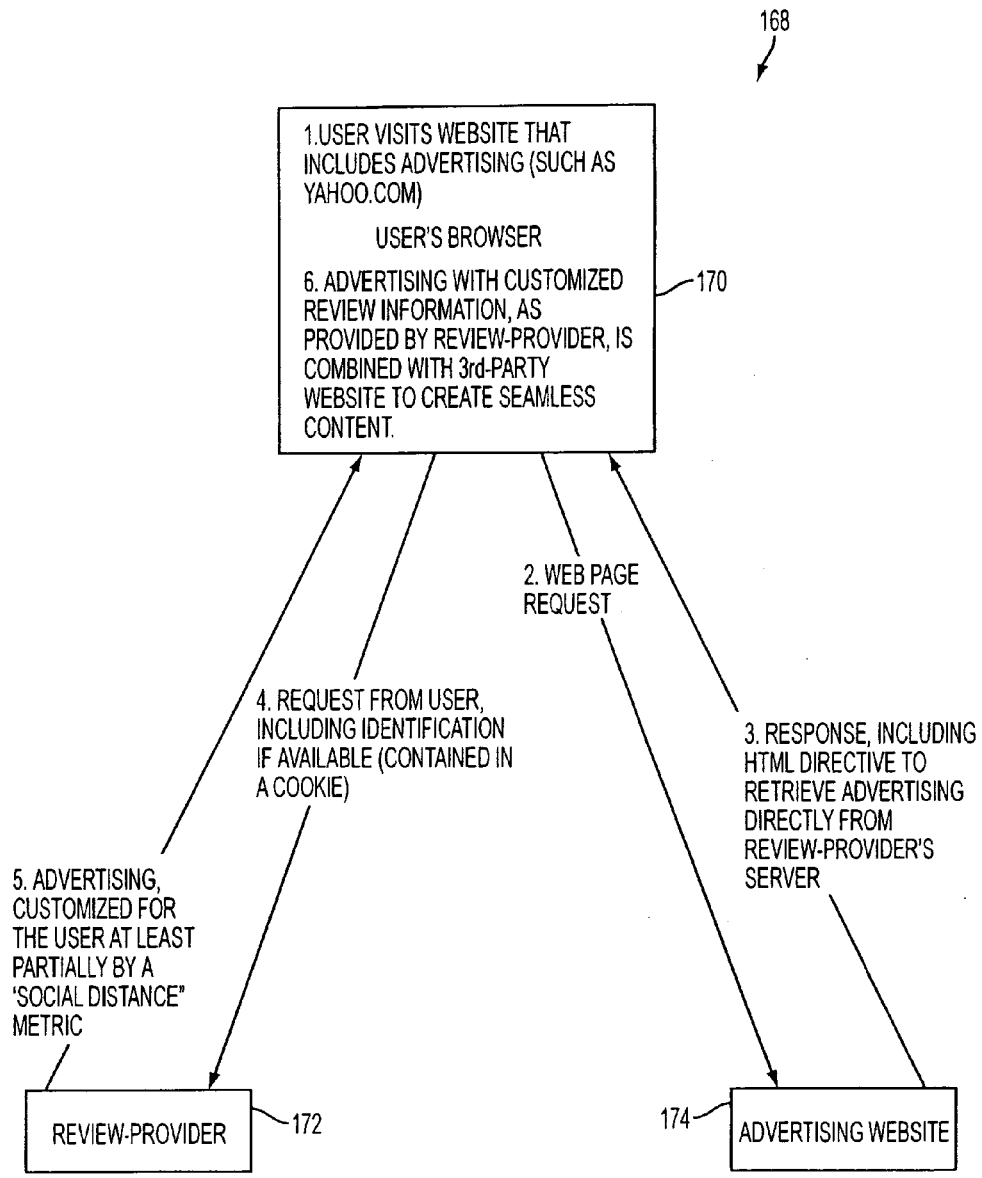
FIG. 12 is a diagram illustrating exemplary information flow within an embodiment of the present review system.

Another exemplary system 168 is shown in FIG. 12. System 168 contains the user's browser 170, the review-provider's server 172, and an advertising website server 174. In system 168 the review-provider 172 also serves the advertisement in this case, there is only communication between the user browser 170 and the review-provider 172. This has the benefit of avoiding possible network delays. This type of application can be extended to all sorts of advertising where the viewer's user ID can be made available to the review-provider's server 172, including "pay-per-click" advertising, banner advertisements, classifieds, auctions, etc. The multi-format syndication system 168 can also be used in "offline" applications where the viewer's User ID can be made available; for example, in television advertisements provided by addressable cable or satellite systems, the advertisement could include a blank area where reviews sorted by a metric that includes "social-distance" can be displayed individually to viewers.

Figure 13:
FIG. 13 is an example of data and reviews provided by an embodiment of the review system.

A slight variant from the advertising system 168 described above is one in which the advertising is replaced by a "compliance seal" provided by the review-provider. As shown in FIG. 13, information 176 provided on a user's browser by the system includes a sample seal 178 and a website link 180. The "seal" 178 can be displayed on any website, but would most likely be displayed on the subject's website. The seal 178 would prove to the user with information about that subject that is stored by the review-provider. Also, the contents of the seal could vary based on the "social distance" between the user and the aggregate of authors of reviews that pertain to the given subject and include a message from a friend. This information 176 would be displayed on a user's computer screen as described with reference to FIG. 15 for example.

Another application of the multi-format syndication system as shown in FIG. 2 is for a location-enabled device such as a cellular phone, PDA, or vehicle navigation console. When a user is traveling in a given neighborhood or is physically standing inside a particular store, the location of the user plus the user's id can be used by the review-provider's server to provide location and "social-distance" specific reviews. In this embodiment, location-enabled device is represented by the user's browser 152.

Another application and embodiment of the multi-format syndication system 52 is for in-store displays. When a customer enters a store, the in-store display senses the user's identity relative the review-provider. The user's identity is transmitted to the review-provider's server, which then returns reviews sorted by "social distance." The in-store displays then displays the reviews for the benefit of the user. In this embodiment, the in-store display is represented by the 3<sup>rd</sup>-party website 156.

Another embodiment and variation of the multi-format syndication system 52 is for displays in general. Examples include billboards and other sorts of smart advertising that automatically tailor the message based on the persons who are walking by. In this exemplary embodiment for example, a user may walk through an airport and the advertisements briefly contain pictures and/or messages from his friends, telling the user to shop at certain merchants. The pictures would change based on the people who are walking by (to their friends). The identity of the people would be sensed in any number of ways, including facial recognition, by a location-enabled device being carried by the person that transmits the person's location to a network that is then accessed by the displays, or by a peer-to-peer connection (such as Bluetooth or WiFi) between a person's personal device and the displays. In this embodiment, the displays in general are represented by the $3^{rd}$-party website 156 and the device being carried by the person is represented by the user's browser 152.

Another application of the multi-format syndication system is for message forums, instant-messenger buddy lists, dating/singles matching networks, or any other application that enables interaction with other people. The application hosted on the $3^{rd}$-party website 164 transmits the user's identity to the review-provider's server 162, which in turn returns "social-distance" enabled review information for that person accessing the third-party website from the user's browser 160. This information is seamless integrated into the message forum, buddy list, matching network, or any other such application.

One element that is important to merchants, manufacturers, persons, or any other subject for which a collection of reviews exists, is the ability to "filter" reviews received. The filtering mechanism of the above systems allows the subject to apply filters at least 1) specific to the syndication channel (i.e. reviews that appear on the merchant's home page, vs. reviews that appear on advertisements, vs. reviews that appear on the review-provider's website, vs. reviews that appear on third-party website #1, vs. reviews that appear on third-party website #2, etc.), 2) specific to how the review was submitted (i.e. by use of a locator code, vs. completely unsolicited), 3) specific to the author of such review (i.e. specific reviewer vs. certain standing vs. merely verified vs. anonymous), 4) specific reviews that the subject chooses to withhold from viewing by the public, and 5) any number of other filters that would be obvious. The filtering mechanism would allow the subject of the reviews to withhold publication of given reviews. It would never allow subjects to modify the contents of any review. In order to achieve full transparency despite the presence of subject-controlled filtering, the review-provider would inform all readers of any set of reviews whether or not the filtering option (and which one) is being utilized by the subject. This leaves the choice up to the subject, who must decide to either filter reviews (but readers will know that the subject is filtering) or confirm to readers that all reviews are being shown unfiltered (but risk a handful of inevitable negative reviews).

Other features of the present embodiments are the ability to allow subjects that have little technical knowledge to 1) easily integrate/deliver reviews from the review-provider to the subject's own websites, advertisements, third-party websites, in-store displays, and even in casual conversation or a casual e-mail, 2) control the filtering of reviews (if they choose to apply filters), 3) control and access all of their billing information, and 4) manage any other issues related to their use of the review-provider system. The review-provider system 10 provides each subject with a private area within the review-provider website from which subjects may perform these functions with ease.

Another desirable feature of this system 10 is the ability for the review-provider to meter or limit access to syndicated review information on a per-channel basis. This is desirable because widespread syndication will consume bandwidth and other resources from the review-provider. The system 10 can meter and limit access based on each "hit" or request that is made for the list of reviews from a given subject, for each "hit" or request that is made for a subset of the list as pertaining to serving advertisement or a seal program, for each "hit" or request that is made for portable devices, for displays (in-store or otherwise), or for any other request made to syndicate review information in any way to a third party. The metering information can be used to limit access when the resource allocation is depleted, or to generate billable charges to the subject or to any other third party based on the amount of use of the syndication system.

The success of any review system ultimately depends on the amount of trust that the general public chooses to place upon any such system. In this case, "trust" is the composite of 1) that the general public believes that private information submitted to the review-provider will not be handled, used, or disclosed in any improper way, and 2) that the reviews contained in the review system are largely legitimate, as opposed to being fraudulently written by sellers or their agents, about themselves or about their competition.

One way to prove the legitimacy of reviews of the present embodiments is simply to disclose the full name of the authors to the public; however, this proves to be impossible if one is to respect the privacy of the review authors. On the other extreme, privacy is ensured if all reviews are submitted and published anonymously; however, this decreases the legitimacy of the reviews. The present embodiments of the system 10 provide an optimal balance.

Privacy engine 46 protects the privacy of review authors within the present system 10 while proving the legitimacy of the reviews by intentionally diminishing the personal information about the author that is disclosed to the public to the point that it can be recognized as a legitimate author, but in such a way that the information cannot be used to contact or completely attribute the review to that author. For example, instead of publishing the author's full name and contact information, the review-provider can choose to publish the author's first name only, or first name plus last initial only. And instead of publishing an email address or other direct contact information, the review provider can publish the city and state in which the author resides. This makes contact with the author impossible, yet provides enough information to suggest to a potential reader that the review is legitimate.

Another variation of the present system 10 is to require the author of a review to provide proof of ownership over the email address the author submitted to the review-provider. This technique is well known, and involves sending a short email to the author, containing an authorization code or authorization link that the author must submit back to the review-provider to prove receipt of the email, and therefore control over that email address. This technique does not prove the identity of the reviewer; it only proves that a given reviewer has access to a given email address. However, this technique can be effective in deterring the authorship of a large number of fraudulent reviews by one person, as it would require procuring a different email account for each fraudulent review, or else be subject to very easy detection by the review-provider, by simply counting the number of reviews originating from a single authenticated email address and auditing accounts that author an excessive number of reviews.

Another variation of a method of authenticating authorship is to ask the reviewer to submit a credit card number. A credit card number can be used to verify the credit card holder's first and last name, and physical mailing address, without incurring any charges to the credit card holder. Though this method is very effective, it is also very invasive (and therefore impractical), as it requires the reviewer to submit sensitive financial information to the review-provider.

When an author verifies her or his identity using any number of methods, all corresponding reviews would be marked accordingly with a "verified" icon or similar method. Likewise, when a review is written under the authority of a subject (by the use of a locator code), the review would be marked accordingly with an "authorized" icon or similar method.

While this does not reveal the identity of the author or the details of the transaction that occurred, it does communicate to readers that the identity verification and transaction verification took place, therefore accruing additional legitimacy to the review and the system.

Another method of authenticating authorship is to leverage the existence of the user's social network (as defined and described previously on this disclosure) to provide definitive indication to a reader of the authenticity and legitimacy of a given review, and without breaching or compromising the privacy of the author of the review. This is accomplished by granting the author of a given review the option to disclose contact/authorship/relationship information based on the "social distance" between him/herself, and the reader of the review. Allowed settings are 1) how much of the name to disclose (full name, first name+last initial only, first name only, initials only, or none); 2) location of author (city/state, state only, country only, or none); 3) relationship (yes or no); 4) allow direct contact (disclose e-mail address; allow anonymous sending of messages through review-provider; allow no contact). In addition to one setting for each possible "social distance" between the author and a given reader, there is a privacy setting for users with infinite "social distance" (i.e. when there is no connection at all between the author and the reader). There can also be additional privacy settings corresponding to specific categories or groups of categories.

In addition to the above system of allowing increasing levels of information to be disclosed about an author based on the "social distance" between the author and the reader, another indicator that can be disclosed with few privacy concerns is the relationship between the author and the reader. When a user submits his or her friends to the review-provider, the user also states the relationship of that friend to the user. For example, if a user decides to add her husband as a "friend" on the review-provider system, the relationship would be set to "spouse." Other possible relationships include "sibling," "co-worker," "family-member," "son," "daughter," "mother," "father," "roommate," "fiancée," "girlfriend/boyfriend," "business partner," and many others. When there is a direct relationship between an author and a reader, the author will be identified as "Your friend John Doe." When the relationship is through multiple people, the author will be identified as "Your friend John Doe's spouse Jane Doe's co-worker Bradley Jones's friend, Laura Smith," or similar based on the number of people between the author and reader. However, if the reader is several degrees away and the author, Laura Smith in this example, has decided to obscure her identity to such readers, the relationship might be identified as "Your friend John Doe's spouse Jane Doe's co-worker Bradley Jones's friend, Laura." Similarly, if Bradley Jones has decided to obscure his identity, it might be "Your friend John Doe's spouse Jane Doe's co-worker Bradley's friend, Laura."

In order to enable applications such as employee reference letters or "suggestion boxes," it is desirable to allow subjects the option to make reviews viewable to only a certain, bounded set of people. This system includes two ways of addressing this requirement. First, the subject can assign a "PIN code" (or password or other "secret") to the base of reviews, which any reader must submit in order to gain access. The subject would then selectively disclose the PIN code to the bounded set of people to which she desires to grant access to the reviews. The second method comprises of a list of unique identifiers, representing people who are authorized to read the set of reviews. The list is maintained by the subject and can only be amended by the subject (or persons authorized by the subject).

Figure 14:
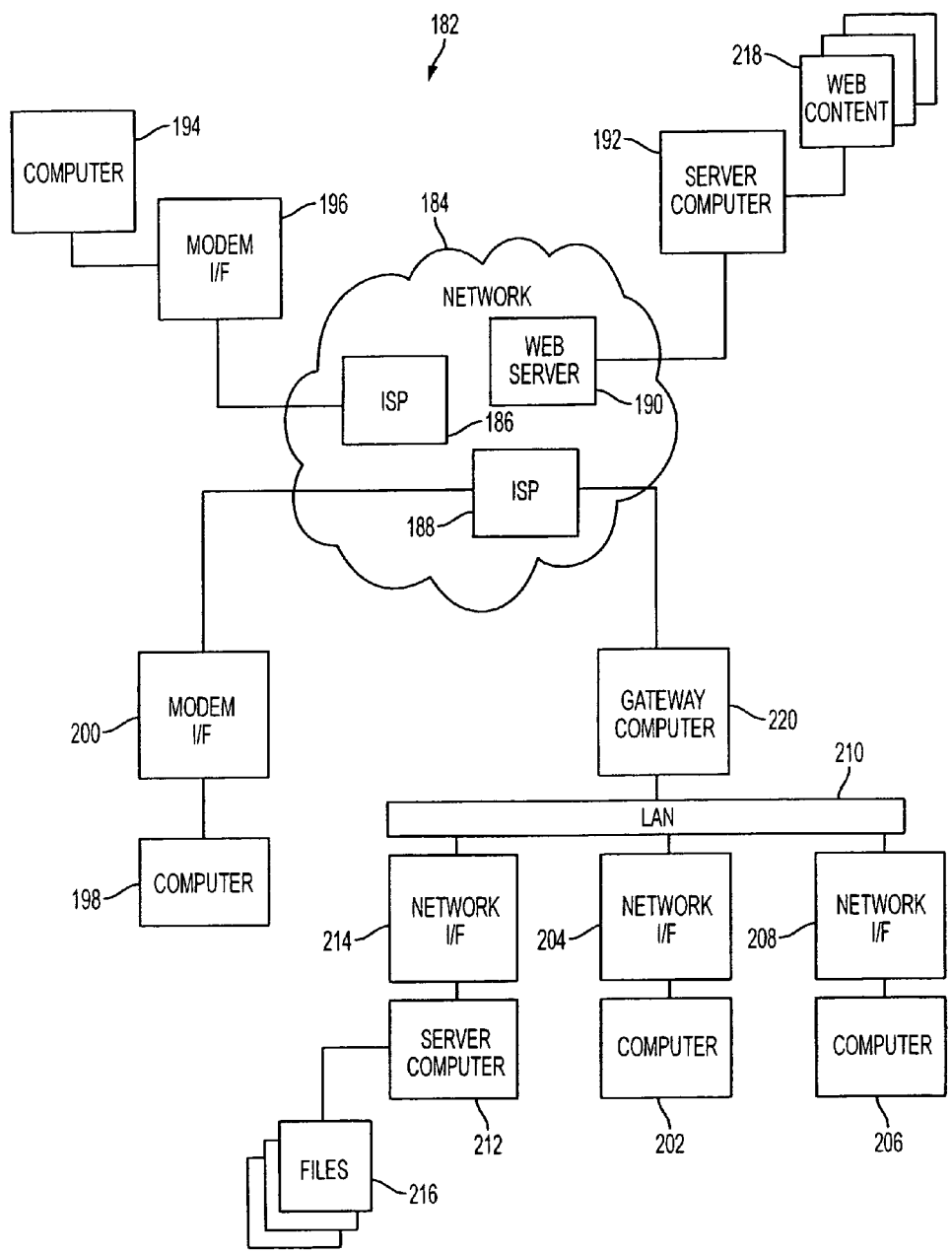
FIG. 14 is a diagram of an exemplary computer network environment that employs embodiments of the review system.
Figure 15:
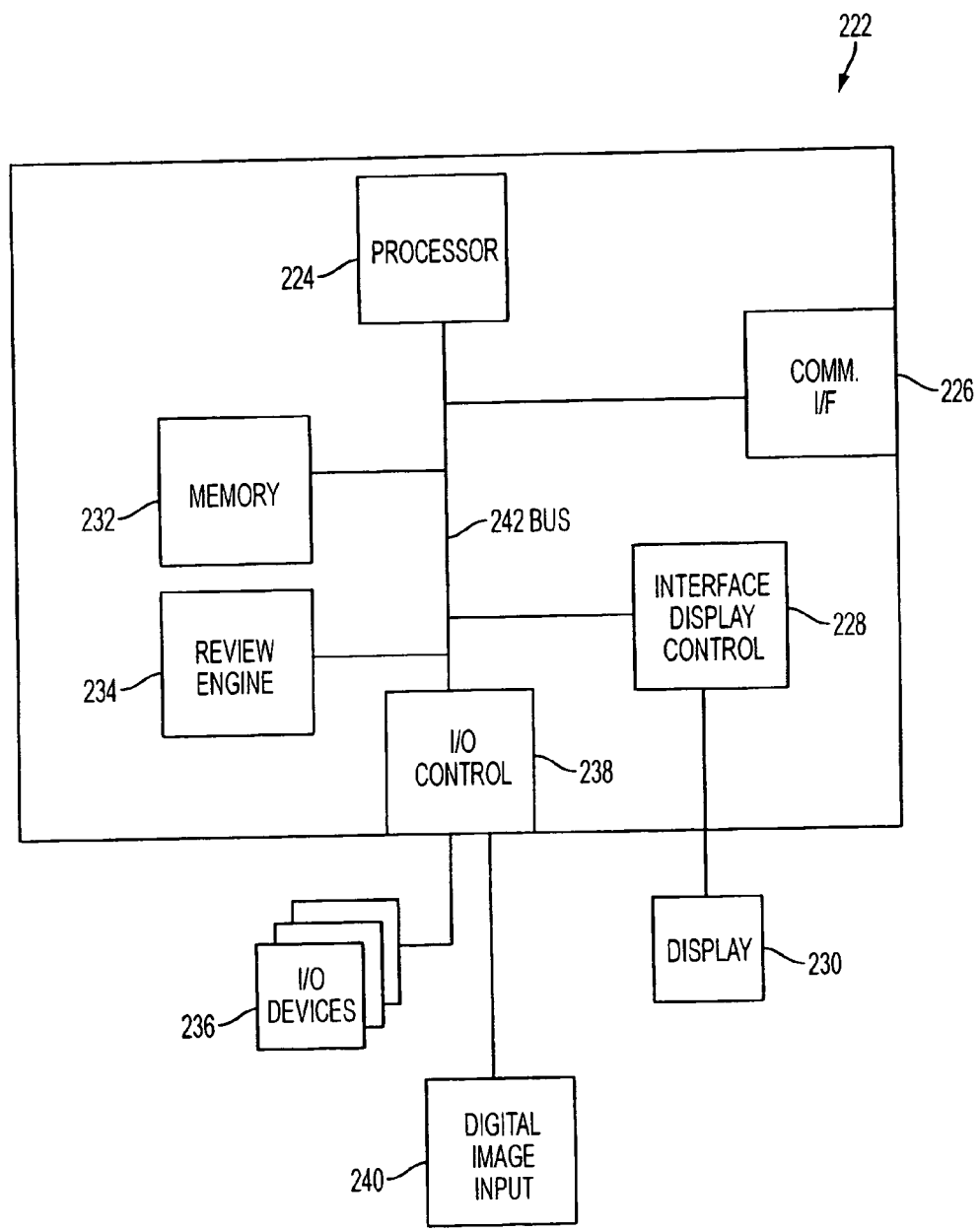
FIG. 15 is a diagram of an exemplary computer system that enacts and enables the embodiment of the review system.

The following description of FIGS. 14-15 is intended to provide an overview of computer hardware and other operating components suitable for performing the methods of the invention, but is not intended to limit the many applicable environments as described above. Similarly, the computer hardware and other operating components may be suitable as part of the systems of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 14 shows several computer systems 182 that are coupled together through a network 184, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 184 is typically provided by Internet service providers (ISP), such as the ISPs 186 and 188. Users on client systems, such as client computer systems 194, 198, 202, and 206 obtain access to the Internet through the Internet service providers, such as ISPs 186 and 188. Access to the Internet allows users of the client computer systems to exchange information, receive and send e-mails, and view documents, such as documents which have been prepared in the HTML format. These documents are often provided by web servers, such as web server 190 which is considered to be "on" the Internet. Often these web servers are provided by the ISPs, such as ISP 186, although a computer system can be set up and connected to the Internet without that system also being an ISP.

The web server 190 is typically at least one computer system which operates as a server computer system and is configured to operate with the protocols of the World Wide Web and is coupled to the Internet. Optionally, the web server 190 can be part of an ISP which provides access to the Internet for client systems. The web server 190 is shown coupled to the server computer system 192 which itself is coupled to web content 218, which can be considered a form of a media database. While two computer systems 190 and 192 are shown in FIG. 14, the web server system 190 and the server computer system 192 can be one computer system having different software components providing the web server functionality and the server functionality provided by the server computer system 192 which will be described further below.

Client computer systems 194, 198, 202, and 206 can each, with the appropriate web browsing software, view HTML pages provided by the web server 190. The ISP 186 provides Internet connectivity to the client computer system 194 through the modem interface 196 which can be considered part of the client computer system 194. The client computer system can be a personal computer system, a network computer, a Web TV system, a wireless PDA or cellular phone or automobile navigation console, or other such computer system.

Similarly, the ISP 188 provides Internet connectivity for client systems 198, 202, and 206, although as shown in FIG. 14, the connections are not the same for these three computer systems. Client computer system 198 is coupled through a modem interface 200 while client computer systems 202 and 206 are part of a LAN. While FIG. 14 shows the interfaces 196 and 200 as generically as a "modem," each of these interfaces can be an analog modem, ISDN modem, cable modem, satellite transmission interface (e.g. "Direct PC"), urban wireless connectivity (e.g. cellular telephony), peer-to-peer interface (e.g. 802.11 and Bluetooth), or other interfaces for coupling a computer system to other computer systems.

Client computer systems 202 and 206 are coupled to a LAN 210 through network interfaces 204 and 208, which can be Ethernet network or other network interfaces. The LAN 210 is also coupled to a gateway computer system 220 which can provide firewall and other Internet related services for the local area network. This gateway computer system 220 is coupled to the ISP 188 to provide Internet connectivity to the client computer systems 202 and 206. The gateway computer system 220 can be a conventional server computer system. Also, the web server system 190 can be a conventional server computer system.

Alternatively, a server computer system 212 can be directly coupled to the LAN 210 through a network interface 214 to provide files 216 and other services to the clients 202, 206, without the need to connect to the Internet through the gateway system 220.

FIG. 15 shows one example of a conventional computer system 222 that can be used as a client computer system, a server computer system, a web server system, a client portable computer system (e.g. PDA or cellular phone or automobile navigation console), a component of a smart advertising display as previously described, etc. The computer system 222 contains a review engine 234 that may contain all the structures as described with reference to FIGS. 1-3. Such a computer system 222 can also be used to perform many of the functions of an Internet service provider, such as ISP 186. The computer system 222 interfaces to external systems through the modem or network interface 226. It will be appreciated that the modem or network interface 226 can be considered as the delivery channels 50 (as shown in FIG. 1) and to be part of the computer system 222. This interface 226 can be an analog modem, ISDN modem, cable modem, token ring interface, satellite transmission interface (e.g. "Direct PC"), urban wireless connectivity (e.g. cellular telephony), peer-to-peer interface (e.g. 802.11 and Bluetooth), or other interfaces for coupling a computer system to other computer systems.

The computer system 222 includes a processor 224, which can be a conventional microprocessor such as an Intel Pentium microprocessor or Motorola Power PC microprocessor. Memory 232 is coupled to the processor 224 by a bus 242. Memory 232 can be dynamic random access memory (DRAM) and can also include static RAM (SRAM). The bus 242 couples the processor 224 to the memory 232, also to review engine 234, to display controller 228, and to the input/output (I/O) controller 238.

The interface display controller 228 controls in the conventional manner a display on a display device 230 which can be a cathode ray tube (CRT) or liquid crystal display (LCD). All necessary interfaces with the review engine are stored and provided by the interface display controller 228. The input/output devices 236 can include a keyboard, disk drives, printers, a scanner, and other input and output devices, including a mouse or other pointing device. The display controller 228 and the I/O controller 238 can be implemented with conventional well known technology. A digital image input device 240 can be a digital camera which is coupled to an I/O controller 238 in order to allow images from the digital camera to be input into the computer system 222.

One of skill in the art will immediately recognize that the terms "machine-readable medium" or "computer-readable medium" includes any type of storage device that is accessible by the processor 224 and also encompasses a carrier wave that encodes a data signal.

The computer system 222 is one example of many possible computer systems which have different architectures. For example, personal computers based on an Intel microprocessor often have multiple buses, one of which can be an input/output (I/O) bus for the peripherals and one that directly connects the processor 224 and the memory 232 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 232 for execution by the processor 224. A Web TV system, which is known in the art, is also considered to be a computer system according to the present invention, but it may lack some of the features shown in FIG. 14, such as certain input or output devices. A typical computer system will usually include at least a processor, memory, and a bus coupling the memory to the processor.

In addition, the computer system 222 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the memory 232 and causes the processor 224 to execute the various acts required by the operating system to input and output data and to store data in memory, including interacting with the review engine 234.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

The systems described in FIGS. 14-15 are therefore capable of enabling the methods described herein regarding the review engine and the features provided to allow users to interface with the system. One skilled in the art will appreciate that although specific embodiments of the review system and methods have been described for purposes of illustration, various modifications can be made without deviating from the scope or spirit of the present invention. Accordingly the invention is described by the appended claims.

What is claimed is:

1. A method implemented on a computer system, comprising:
   receiving a request for a review on a subject from a user;
   retrieving reviews pertaining to the subject;
   determining if the user is known or unknown; and
   providing the reviews to the user in a first manner if the user is known and in a second manner if the user is unknown, wherein an author of the reviews is stored, and further wherein providing the reviews to the user in the first manner includes sorting the reviews responsive to social distance, and providing the reviews to the user in the second manner includes not sorting the reviews by social distance.

2. A method as recited in claim 1 wherein providing the reviews to the user in the first manner further includes sorting responsive to at least one other parameter.

3. A method as recited in claim 2 wherein the at least one other parameter corresponds to dates of reviews.

4. A method as recited in claim 1 wherein providing the reviews to the user in the first manner further includes sorting responsive to dates of the reviews and at least one other parameter.

5. A method as recited in claim 1 wherein the reviews provided are subject to privacy constraints.

6. A method as recited in claim 1 wherein the reviews are stored in a database.

7. A method as recited in claim 1 wherein the reviews are provided on a display.

8. A method as recited in claim 1 wherein the reviews are stored in a database.

9. A method implemented on a computer system, comprising:
   receiving a request for reviews on a subject from a user;
   retrieving reviews pertaining to the subject;
   determining if the user is registered or unregistered;
   providing the reviews to the user in a first manner if the user is registered and in a second manner if the user is unregistered, and
   wherein providing the reviews to the user in the first manner includes sorting the reviews responsive to social distance and providing the reviews in the second manner to unregistered users includes providing reviews that are not sorted by social distance,
   and further wherein an author of the reviews is stored.

10. A method as recited in claim 9 wherein the reviews provided are subject to privacy constraints.

11. A method as recited in claim 9 wherein the request for a review is received by a review engine.

12. A method as recited in claim 9 wherein providing the reviews to the user in the first manner further includes sorting responsive to at least one other parameter, and providing the reviews to the user in the second manner includes sorting responsive to the at least one other parameter.

13. A method as recited in claim 12 wherein the at least one other parameter corresponds to dates of reviews.

14. An apparatus, comprising:
   a server;
   a database that contains user information, user author information, and reviews;
   a review engine running on said server that provides reviews from the database responsive to a user's request and sorts by social distance between the user and an author of a review if the user is registered and does not sort the provided reviews by social distance if the user is unregistered; and
   at least one interface to provide reviews selected by the review engine to the user.

15. An apparatus as recited in claim 14 wherein the review engine further sorts provided reviews in the first manner and the second manner based on dates of the reviews.

16. An apparatus as recited in claim 14 wherein the review engine further sorts provided reviews in the first manner and the second manner based on at least one other parameter.

17. An apparatus as recited in claim 14 wherein the database includes a subjects database, a user author reviews database and a users and friends database.

18. An apparatus as recited in claim 14 wherein the interface includes a display and a keyboard.

19. An apparatus as recited in claim 14 wherein the review engine further includes a privacy engine.

20. An apparatus as recited in claim 14 further comprising a reviews subset selector connected to the reviews engine.

21. An apparatus as recited in claim 14 further comprising one or more support modules connected to the database.

22. An apparatus as recited in claim 21 wherein the support modules include a subject control panel and a locator/verifier/incentive engine.

23. An apparatus as recited in claim 22 wherein the support modules further include a social linker, user control panel, user signup module.

24. An apparatus as recited in claim 14 further comprising an anonymous contact module connected to the reviews engine.

25. An apparatus as recited in claim 14 further comprising delivery channels connected to the reviews engine for communications with the interface.

26. An apparatus, comprising:
a web server that maintains a website; and
a review provider engine sever that includes a database that contains user information, user author information, and reviews, wherein the review provider engine server provides reviews from the database to a user's browser responsive to a user's request and sorted by a calculated social distance between the user and an author of a review if the user is registered and not sorted by social distance if the user is unregistered.

27. An apparatus as recited in claim 26 wherein the website is a third party website.

28. An apparatus as recited in claim 26 wherein the review provider engine automatically provides a review to the user's browser when the user accesses the website.

29. An apparatus as recited in claim 28 wherein the users browser simultaneously displays both the provided review and website information.

30. An apparatus as recited in claim 26 wherein the review provider engine includes a social network engine that sorts and provides reviews to the users browser.

* * * * *